United States Patent
Kim et al.

(10) Patent No.: US 10,203,675 B2
(45) Date of Patent: Feb. 12, 2019

(54) COMMUNICATION SYSTEM AND OPERATING METHOD THEREOF

(71) Applicant: LSIS CO., LTD., Anyang-si, Gyeonggi-do (KR)

(72) Inventors: Young In Kim, Seongnam-si (KR); Ae Kyoung Bae, Anyang-si (KR); Hong Joo Kim, Seoul (KR); Yoon Sung Cho, Gyeongsan-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 296 days.

(21) Appl. No.: 14/958,762

(22) Filed: Dec. 3, 2015

(65) Prior Publication Data
US 2016/0306331 A1   Oct. 20, 2016

(30) Foreign Application Priority Data
Apr. 17, 2015   (KR) .......................... 10-2015-0054782

(51) Int. Cl.
| | |
|---|---|
| G05B 19/042 | (2006.01) |
| H02J 13/00 | (2006.01) |
| G08C 17/02 | (2006.01) |
| H02J 3/00 | (2006.01) |

(52) U.S. Cl.
CPC ........... *G05B 19/042* (2013.01); *G08C 17/02* (2013.01); *H02J 13/0027* (2013.01); *G05B 2219/24215* (2013.01); *H02J 3/00* (2013.01); *Y02E 60/7884* (2013.01); *Y04S 40/143* (2013.01)

(58) Field of Classification Search
None
See application file for complete search history.

(56) References Cited

U.S. PATENT DOCUMENTS

| | | |
|---|---|---|
| 2005/0033466 A1 | 2/2005 | Eryurek et al. |
| 2008/0140326 A1 | 6/2008 | Scholtz et al. |
| 2009/0012650 A1 | 1/2009 | Wang et al. |
| 2009/0138324 A1 | 5/2009 | Nagafuchi et al. |
| 2009/0254655 A1 | 10/2009 | Kidwell et al. |
| 2011/0153108 A1 | 6/2011 | Yoon et al. |

(Continued)

FOREIGN PATENT DOCUMENTS

| | | |
|---|---|---|
| CN | 201464841 U | 5/2010 |
| CN | 103296750A A | 9/2013 |

(Continued)

OTHER PUBLICATIONS

Kusic et al., Measurement of Transmission Line Parameter from SCADA Data, 2004 IEEE.*

(Continued)

*Primary Examiner* — Carlos R Ortiz Rodriguez
(74) *Attorney, Agent, or Firm* — K&L Gates LLP

(57) ABSTRACT

A communication system includes a first remote terminal unit (RTU) outputting first RTU data, a second RTU outputting second RTU data, and a remote control center applying a first RTU weight, which is a weight for the first RTU, to the output first RTU data and a second RTU weight, which is a weight for the second RTU, to the output second RTU data, and generating state estimation information for the first and second RTUs on the basis of the first and second RTU data to which each of the first and second RTU weights are applied.

10 Claims, 8 Drawing Sheets

(56) References Cited

U.S. PATENT DOCUMENTS

2011/0184547 A1    7/2011   Loutfi
2013/0214927 A1    8/2013   Kim et al.

FOREIGN PATENT DOCUMENTS

| EP | 2632007 | 8/2013 |
| JP | 2004-220447 | 8/2004 |
| KR | 10-2009-0071933 | 7/2009 |
| KR | 10-2010-0022785 | 3/2010 |
| KR | 10-2011-0059683 | 6/2011 |
| KR | 10-1151677 | 8/2012 |
| KR | 10-2013-0096472 | 8/2013 |
| KR | 10-2013-0099507 | 9/2013 |
| KR | 10-2014-0032846 | 3/2014 |

OTHER PUBLICATIONS

Korean Intellectual Property Office Application Serial No. 10-2015-0054782, Office Action dated Mar. 2, 2016, 4 pages.
European Patent Office Application Serial No. 16151855.0, Search Report dated Sep. 6, 2016, 7 pages.
Chinese Office Action dated Nov. 7, 2018 in corresponding Korean Patent Application No. 10-2015-0054782.
G.L. Kusic, et al.; "Measuring of transmission line parameters from SCADA data"; 0-7803-8718-X/04/$20.00 copyright 2004 IEEE.; 6 Pages.

\* cited by examiner

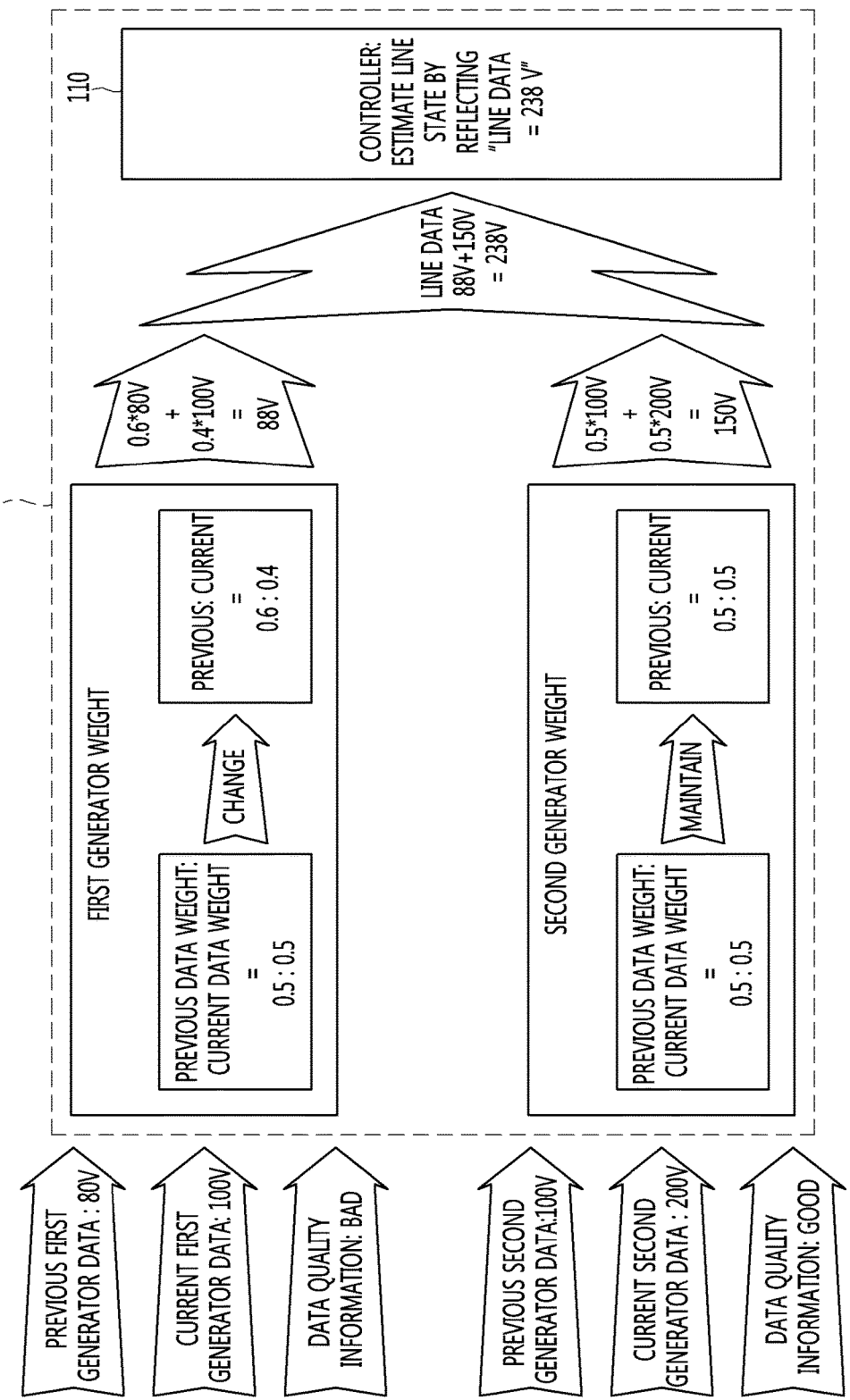

COMMUNICATION SYSTEM AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0054782, filed on Apr. 17, 2015, the contents of which are all hereby incorporated by reference herein in its entirety.

BACKGROUND

The present disclosure relates to a communication system and an operating method thereof, and particularly, to a communication system capable of controlling a remote terminal unit (RTU) of a supervisory control and data acquisition (SCADA) system and an operating method thereof.

A supervisory control and data acquisition (SCADA) system is defined as a communication system for collecting, receiving, recording, displaying, at a remote control center (RCC), state signal data (or points) of a plurality of RTUs using an analog or digital signal on a communication path and allowing the RCC to supervise and control each of the RTUs.

The SCADA system is typically a system for supervising and controlling, in a centralized manner, many kinds of remote facilities such as power generation, transmission, and distribution facilities, a petrochemical plant, an iron and steel making facility, and a factory automation facility, etc.

The SCADA system performs functions of a supervising system for performing a pre-determined operation according to a state of an RTU, for example, an alarm function, a supervising and controlling function for selectively operating the RTU manually or automatically, and an instructing function or displaying function of the supervising system for receiving, displaying, or recording a state signal of the RTU.

The RCC of the SCADA system periodically obtains a state signal (or state value) at determined times, generates system analysis information (or unique algorithm) used for controlling the plurality of RTUs on the basis of the obtained state signals, and controls each of the RTUs on the basis of the generated system analysis information.

Furthermore, the RCC may receive the state signal (or value) ("open" or "close") from a cutout (a specific RTU) and at the same time, receive signal quality information ("good" or "suspect") that is information including whether each state signal is normal or erroneous, generate analysis information on each RTU in correspondence to the received signal quality information, and may collect the analysis information on the plurality of RTUs to perform state estimation on lines provided with the plurality of RTUs.

The state estimation may be defined as specific information for controlling the lines provided with the plurality of RTUs.

However, in related art, there is a limit in matching the state estimation, since weights are given to each facility group. In detail, as illustrated in FIG. 1, the RCC converts each RTU data output from each of the plurality of RTUs (e.g. a transformer, generator, and load) included in each line into each RTU group data, corrects the each converted RTU group data by adding a weight for each RTU data, integrates the corrected RTU group data into line data, and performs state estimation on each of the lines on the basis of the integrated line data.

In this case, there is no choice to perform state estimation on the basis of each RTU group data, and since it is difficult to reflect each state data of each RTU included in each RTU group, there is a limitation of degradation in matching of the state estimation.

Moreover, the RCC may receive the state signal (or value) (e.g. "open" or "close") from each RTU and at the same time, receive signal quality information (e.g. "good" or "suspect") including whether each state signal is normal or erroneous, generate analysis information on each RTU in correspondence to the received signal quality information, and may collect the analysis information on each RTU to generate system analysis information that is analysis information on the plurality of RTUs.

In particular, while a data signal having quality of "GOOD" is output from a specific RTU, once a data signal having quality of "SUSPECT" is output, the data signal having quality of "SUSPECT" becomes used and matching of the state estimation becomes further lowered.

SUMMARY

Embodiments provide a communication system capable of reducing occurrence of errors and improving matching, when system analysis information is generated on each RTU, and an operation method thereof In one embodiment, a communication system includes: a plurality of remote terminal units (RTUs) outputting a plurality of pieces of RTU data; and a remote control center (RCC) generating state estimation information on lines respectively connected to the plurality of RTUs, wherein the RCC applies a weight for each of the plurality of RTUs to the plurality of pieces of RTU data, and generates the state estimation information on a basis of the plurality of pieces of RTU data.

In another embodiment, an operating method of a communication system includes: outputting a plurality of pieces of RTU data; applying a weight for each of a plurality of RTUs to each of the plurality of pieces of RTU data; and generating state estimation information on lines respectively connected to the plurality of RTUs on a basis of the plurality of pieces of RTU data to which the weights are respectively applied.

The details of one or more embodiments are set forth in the accompanying drawings and the description below. Other features will be apparent from the description and drawings, and from the claims.

BRIEF DESCRIPTION OF THE DRAWINGS

FIG. 8 is a block configuration diagram illustrating an RTU weight applying method according to still another embodiment.

DETAILED DESCRIPTION OF THE EMBODIMENTS

Figure 1:
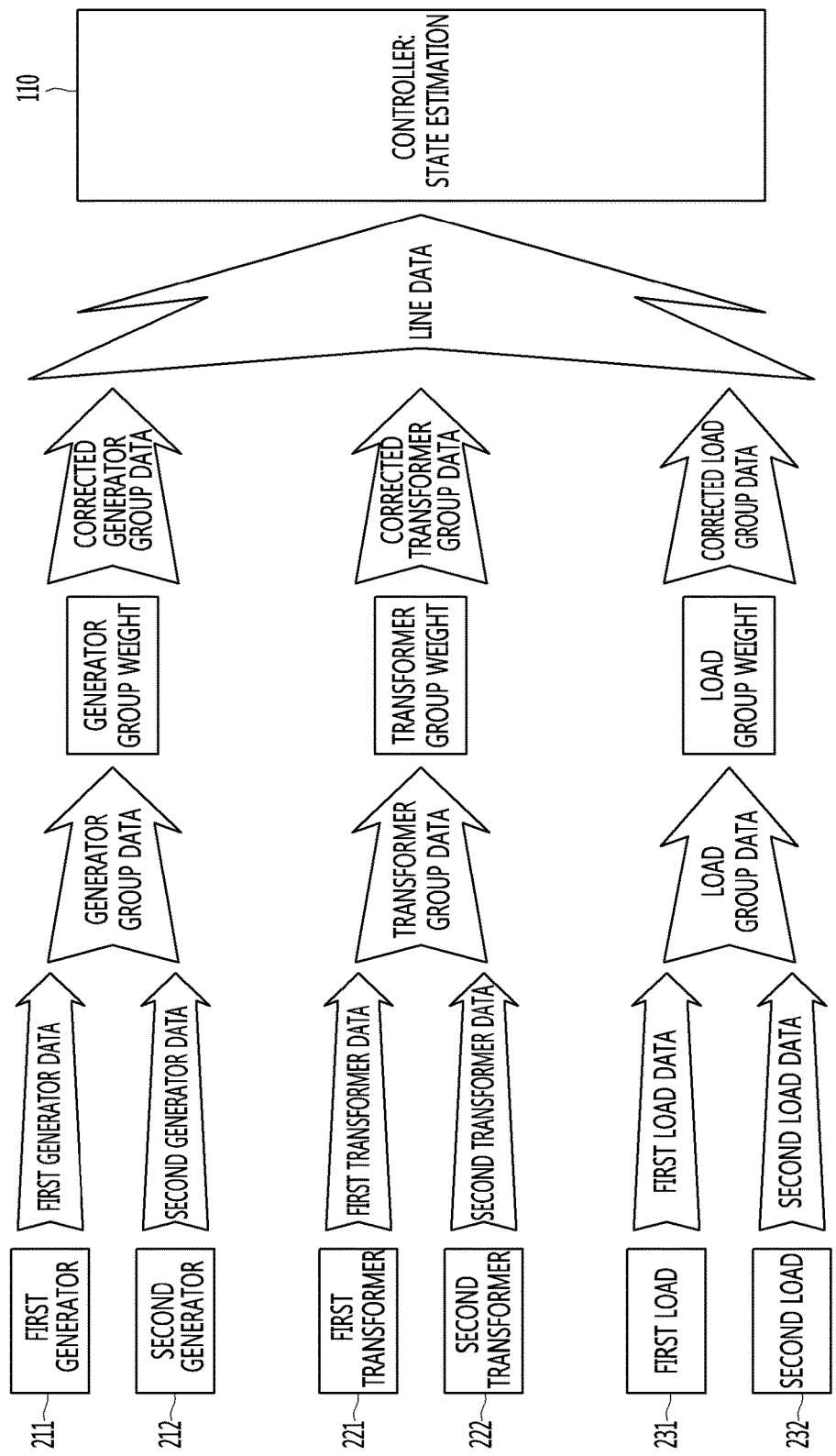
FIG. 1 is a block configuration diagram illustrating a method for generating state estimation information according to related art.

Reference will now be made in detail to the embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

In the following description, detailed descriptions of well-known functions or constructions will be omitted since they would obscure the invention in unnecessary detail. Moreover, numerals (e.g., first, second, etc.) in the description are used only to distinguish one element from another.

The terms used in this specification were selected to include current, widely-used general terms. In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present disclosure.

It will be understood that when an element is referred to as being "connected" or "coupled" to another element, it may be directly connected or coupled to the other element or intervening elements may be present in between unless otherwise specified.

Throughout this specification, when an element is referred to as "including" a component, it does not preclude another component but may further include the other component unless the context clearly indicates otherwise.

Hereinafter, embodiments of the present invention will be described in detail with reference to the accompanying drawings. Also, the same or similar reference numerals provided in each drawing denote the same or similar components.

Hereinafter, referring to FIGS. 2 to 8, a detailed description will be provided about a method for generating state estimation information on each line by applying a weight for each remote device.

Figure 2:
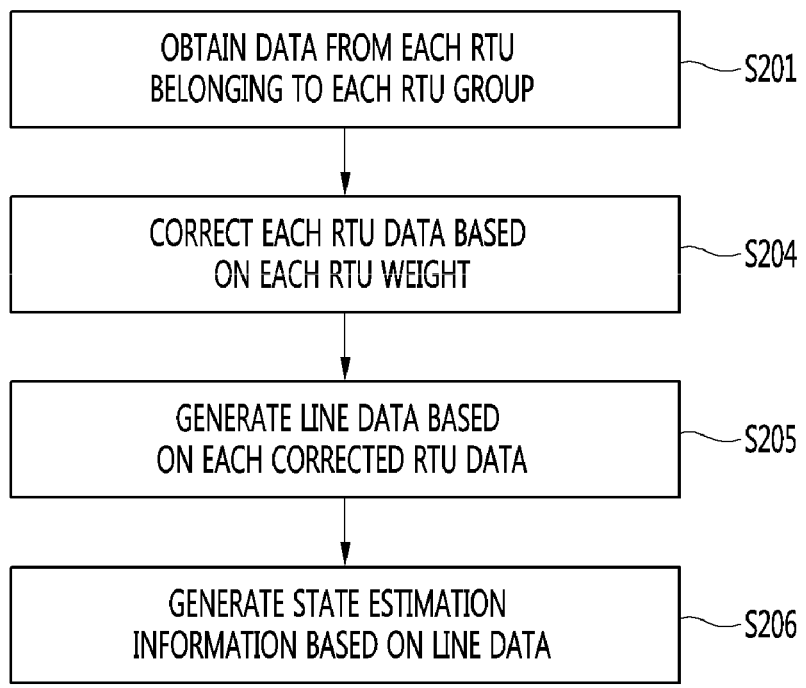
FIG. 2 is a flowchart illustrating a weight applying method according to an embodiment.

FIG. 2 is a flowchart illustrating a weight applying method according to an embodiment.

Referring to FIG. 2, a remote control center (RCC) obtains data from each remote terminal unit (RTU) included in each RTU group (operation S201).

An example of the RTU may include, but is not limited to, a generator, transformer, or load.

An example of data obtained from each RTU may include, but is not limited to, generator data, transformer data, or load data.

An example of the generator data may include an effective voltage value (e.g. 100 V) of each generator.

When the RTU data is obtained from each RTU, the RCC corrects the RTU data obtained from each RTU on the basis of an RTU weight for each RTU (operation S204).

In detail, the RCC may perform a control calculation for the RTU data on the basis of the RTU weight for each RTU. According to the embodiment, the RCC may perform a calculation for multiplying each RTU data by the RTU weight for each RTU.

When each RTU data is corrected, the RCC generates line data for a line including each RTU on the basis of the corrected RTU data (operation S205).

The RCC may integrate the corrected RTU data into one line data.

When the line data is generated, the RCC may generate state estimation information for each line on the basis of the line data (operation S206).

The control unit may control each RTU provided on the line on the basis of the generated state estimation information.

Figure 3:
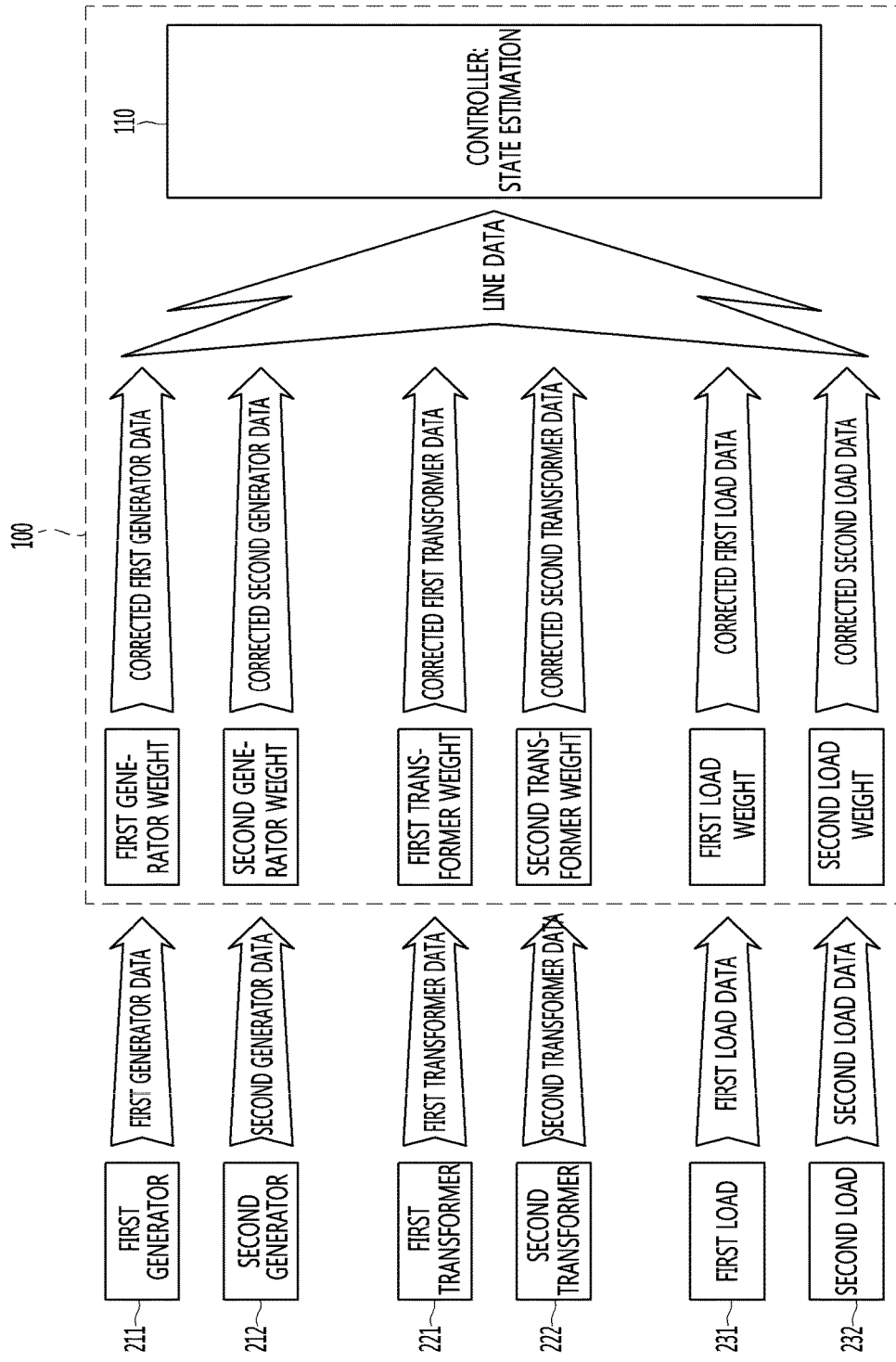
FIG. 3 is a block configuration diagram illustrating a method for generating state estimation information according to an embodiment.

FIG. 3 is a block configuration diagram illustrating a method for generating state estimation information according to an embodiment.

Referring to FIG. 3, a first generator 211 and a second generator 212 may respectively output first and second generator data. In addition, first and second transformers 221 and 222 may respectively output first and second transformer data. Identically, first and second loads 231 and 232 may respectively output first and second load data.

The RCC 100 may generate corrected first generator data by applying first generator weight, which is a weight for the first generator 211, to the first generator data output from the first generator 211.

According to an embodiment, the weight for the first generator 211 may be set in various manners.

The weight for the first generator 211 may be set in advance by the RCC 100 or through a user input.

The first generator weight may be set in advance according to the state of the first generator (e.g. a temperature of the first generator, or whether the first generator is overheated).

When the signal quality information (e.g. "GOOD" or "SUSPECT") on the first generator data, which is output at each preset period, indicates "SUSPECT" the preset number of times (e.g. three times), the first generator weight may be set to be lower than that in case where the signal quality information indicates "GOOD".

It will be obvious for a person skilled in the art that the description above for the first generator weight may also be identically applied to a second generator weight, a first transformer weight, a second transformer weight, a first load weight, or a second load weight.

Identically, the RCC 100 may correct the second generator data by applying the second generator weight thereto. In addition, the RCC 100 may correct the first and second transformer data by respectively applying the first and second transformer weights thereto. Identically, the RCC 100 may correct the first and second load data by respectively applying the first and second load weights thereto.

When the corrected data is generated for each RTU, the RCC 100 may integrate the corrected data for each RTU to generate line data.

When the line data is generated, a controller 110 of the RCC 100 may perform state estimation on each line on the basis of the line data.

Figure 4:
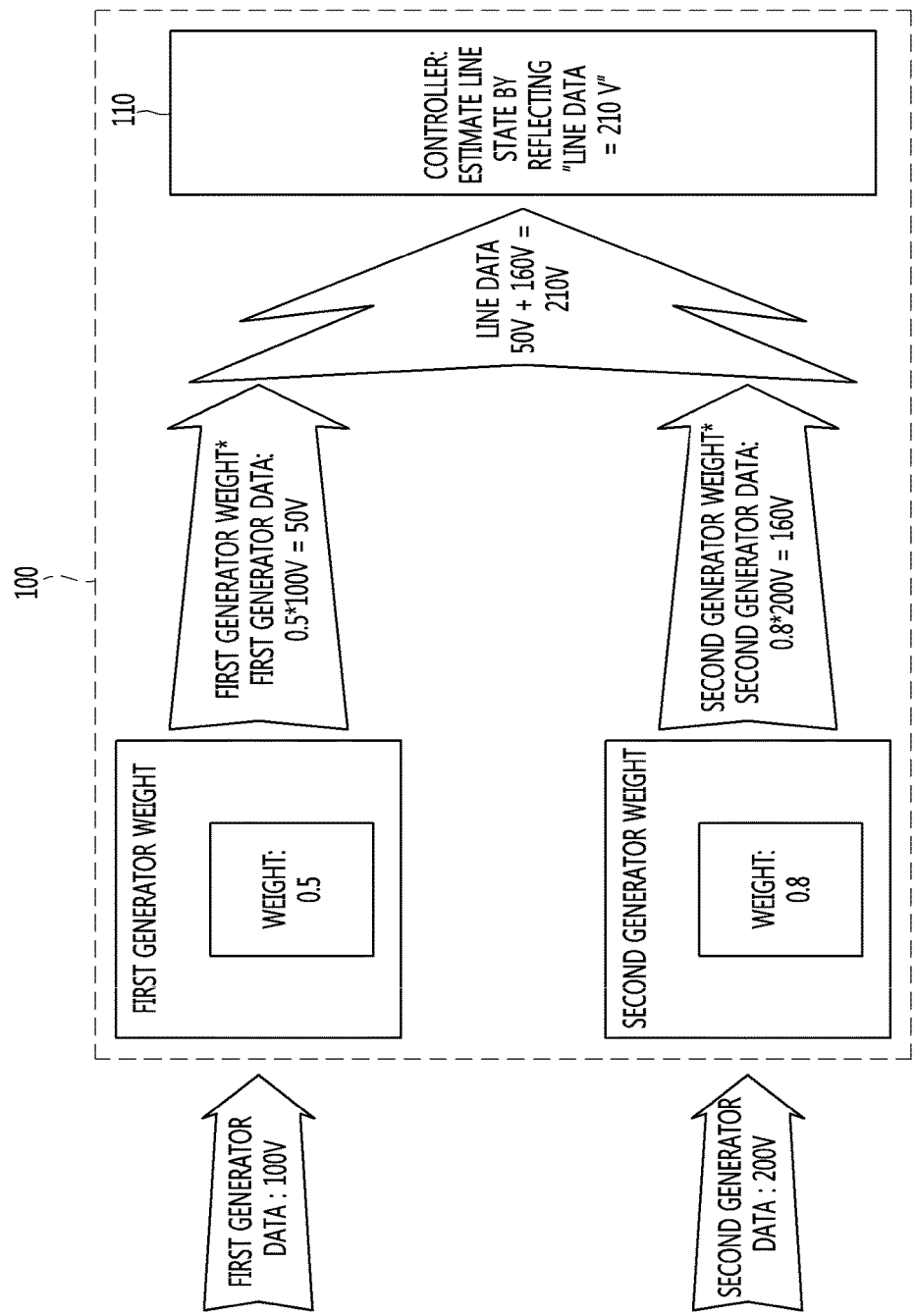
FIG. 4 is a block configuration diagram illustrating a remote terminal unit (RTU) weight applying method according to an embodiment.

FIG. 4 is a block configuration diagram illustrating a RTU weight applying method according to an embodiment.

FIG. 4 illustrates the first generator data of 100 V and the second generator data of 200 V respectively output from the first generator 211 (FIG. 2) and the second generator 212 as examples of the RTU data.

The RCC 100 may apply (0.5*100 V) a preset first generator weight of 0.5 to the first generator data of 100 V, which is output from the first generator 211 (FIG. 2), to generate the corrected first generator data of 50 V.

In addition, the RCC 100 may apply (0.8*200 V) a preset second generator weight of 0.8 to the second generator data of 200 V, which is output from the second generator 212 (FIG. 2), to generate the corrected second generator data of 160 V.

When the first generator data of 100 V and the second generator data of 200 V are corrected (i.e. 50 V and 160 V), the RCC 100 may generate line data (i.e. 50 V+160 V=210 V) for a line provided with each RTU (e.g. first and second generators) on the basis of each corrected data of 50 V and 160 V.

When the line data of 210 V is generated, the RCC 100 may perform state estimation on the line by applying the line data of 210 V.

Figure 5:
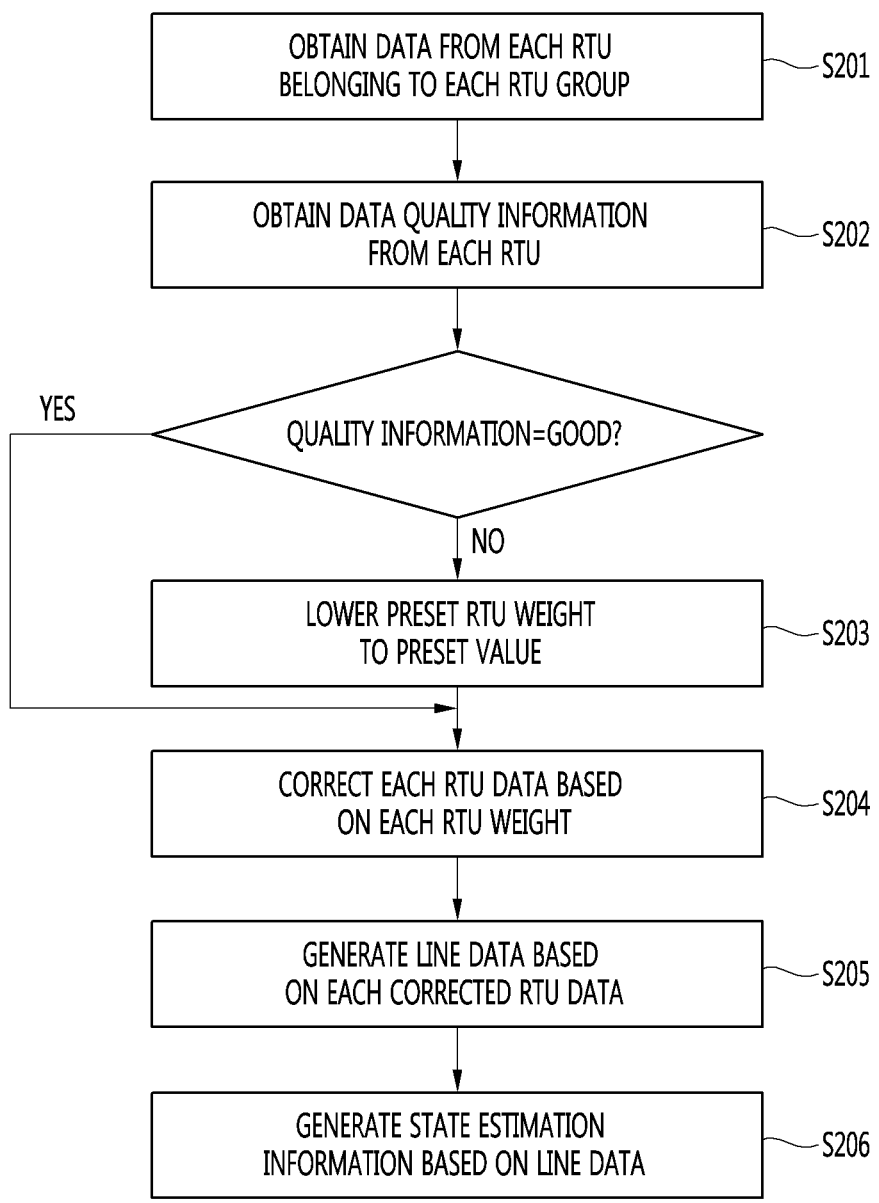
FIG. 5 is a flowchart illustrating an RTU weight applying method according to an embodiment.

FIG. 5 is a flowchart illustrating a RTU weight applying method according to an embodiment.

In existing technology, an identical weight is applied, once data is erroneously obtained from a line while good data is obtained at other times, or even when there is a serious fluctuation in the obtained data. In this case, the matching of state estimation becomes lowered.

Accordingly, in order to improve the matching of the state estimation, in the embodiment, the weight is lowered through accumulation when not good data is frequently obtained for each facility or the obtained data exceeds an allowance range, and the weight is maintained in a period where good quality data is continuously obtained.

As illustrated in FIG. 5, the RCC 100 (of FIG. 4) obtains data from each RTU belonging to each RTU group (operation S201), and obtains data quality information, which includes quality information for each RTU data, from each RTU (operation S202).

The data quality information (or signal quality information) may be information that becomes a reference for determining whether data for each RTU, which is output from each RTU, is reliable. According to an embodiment, the data quality information may include information on whether the signal is normal or erroneous. In this case, the normal signal may be indicated by the data quality information value of "GOOD", and the erroneous signal may be indicated by the data quality information value of "SUSPECT". Furthermore, the data quality information value is not limited to "GOOD" and "SUSPECT", and may be diversely modified and added according to an embodiment.

When the obtained data quality information is not determined to be "GOOD", the RCC 100 (FIG. 2) lowers (or changes) a preset RTU weight to a preset value (S203), and corrects each RTU data on the basis of the each changed RTU weight (operation S204). In other words, when not good data is frequently obtained or the obtained data exceeds the allowance range, the RTU weight is lowered.

When the obtained data quality information is determined to be "GOOD", the RCC 100 (FIG. 2) corrects each RTU data on the basis of each preset RTU weight (operation S204). In other words, the weight is maintained in a period where the good quality data is continuously obtained.

When each RTU data is corrected, the controller 110 of the RCC 100 generates line data on the basis of the each corrected RTU data (operation S205), and generates state estimation information on the generated line data (operation S206).

Figure 6:
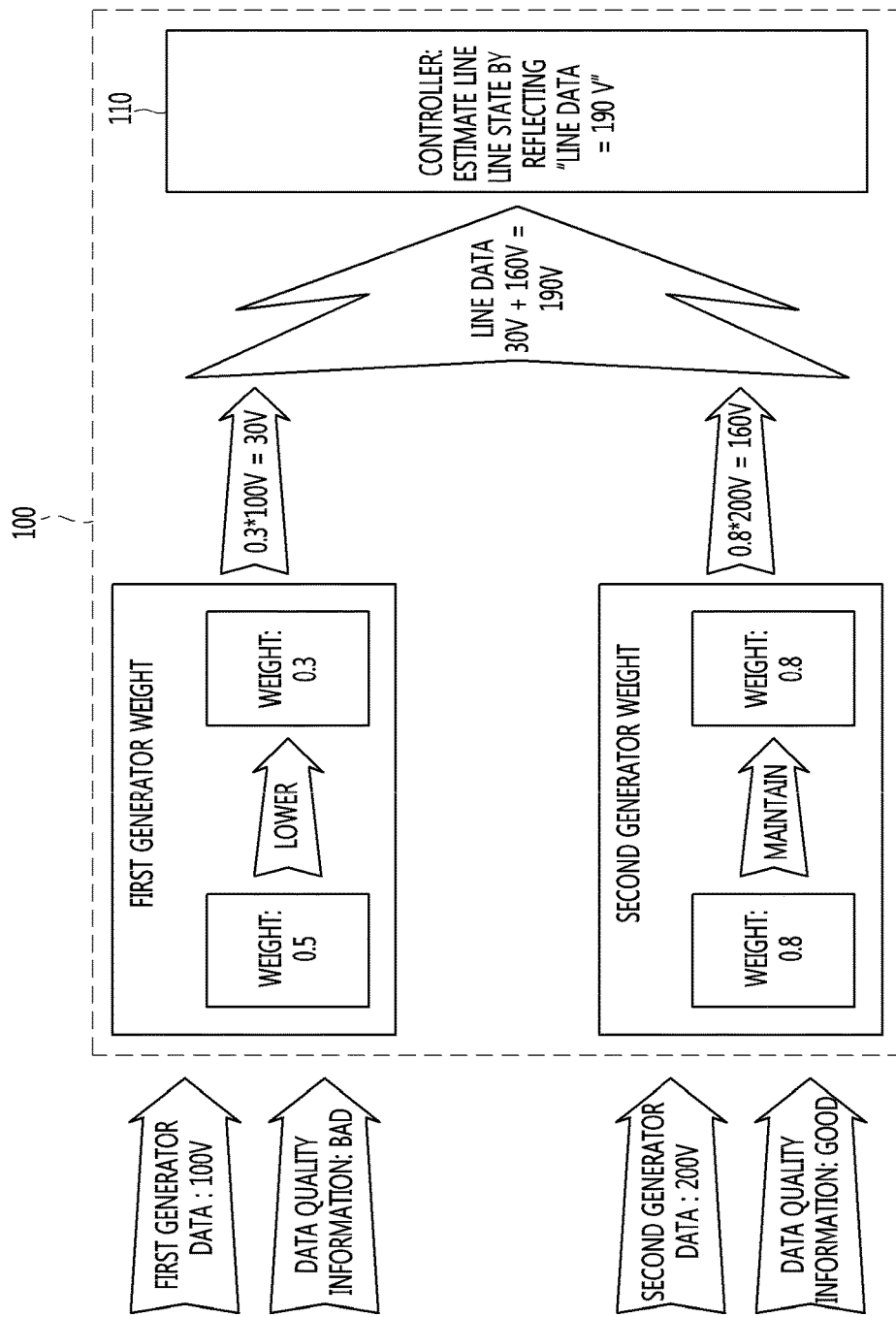
FIG. 6 is a block configuration diagram illustrating an RTU weight applying method according to another embodiment.

FIG. 6 is a block configuration diagram illustrating a RTU weight applying method according to another embodiment.

Referring to FIG. 6, the RCC 100 may obtain the first generator data of 100 V and data quality information of "BAD" for the first generator data from the first generator 211 (of FIG. 3). At the same time, the RCC 100 may obtain the second generator data of 200 V and data quality information of "GOOD" for the second generator data from the second generator 212 (of FIG. 3).

When each RTU data of 100 V and 200 V, and the data quality information of "GOOD" and "BAD" are obtained, the RCC 100 may change (or lower) the weight of "0.5" preset for the first generator 211 (of FIG. 3) to "0.3" in response to the data quality information ("BAD") obtained from the first generator 211 (of FIG. 3). In other words, the preset weight is lowered since not good data is obtained. At the same time, the RCC 100 may identically maintain, with respect to the second generator 212 (of FIG. 3), the weight of "0.8" preset in response to the data quality information of "GOOD" obtained from the second generator 212 (of FIG. 3). In other words, the preset weight is maintained since the good quality data is obtained.

When the weight of 0.5 or 0.8 for the RTUs (i.e. first and second generators) is changed from 0.5 to 0.3 or maintained as 0.8, the RCC 100 may apply the changed weight of 0.3 to the first generator data of 100 V (i.e. 0.3*100 V=30 V) and apply the maintained weight of 0.8 to the second generator data of 200 V (i.e. 0.8*200 V=160 V) to generate the corrected first and second generator data of 30 V and 160 V.

Then the RCC 100 integrates the generated first and second generator data of 30 V and 160 V (i.e. 30 V+160 V=190 V) to generate the line data of 190 V. In addition, the controller 110 of the RCC 100 may generate the state estimation information on the basis of the generated line data of 190 V.

Figure 7:
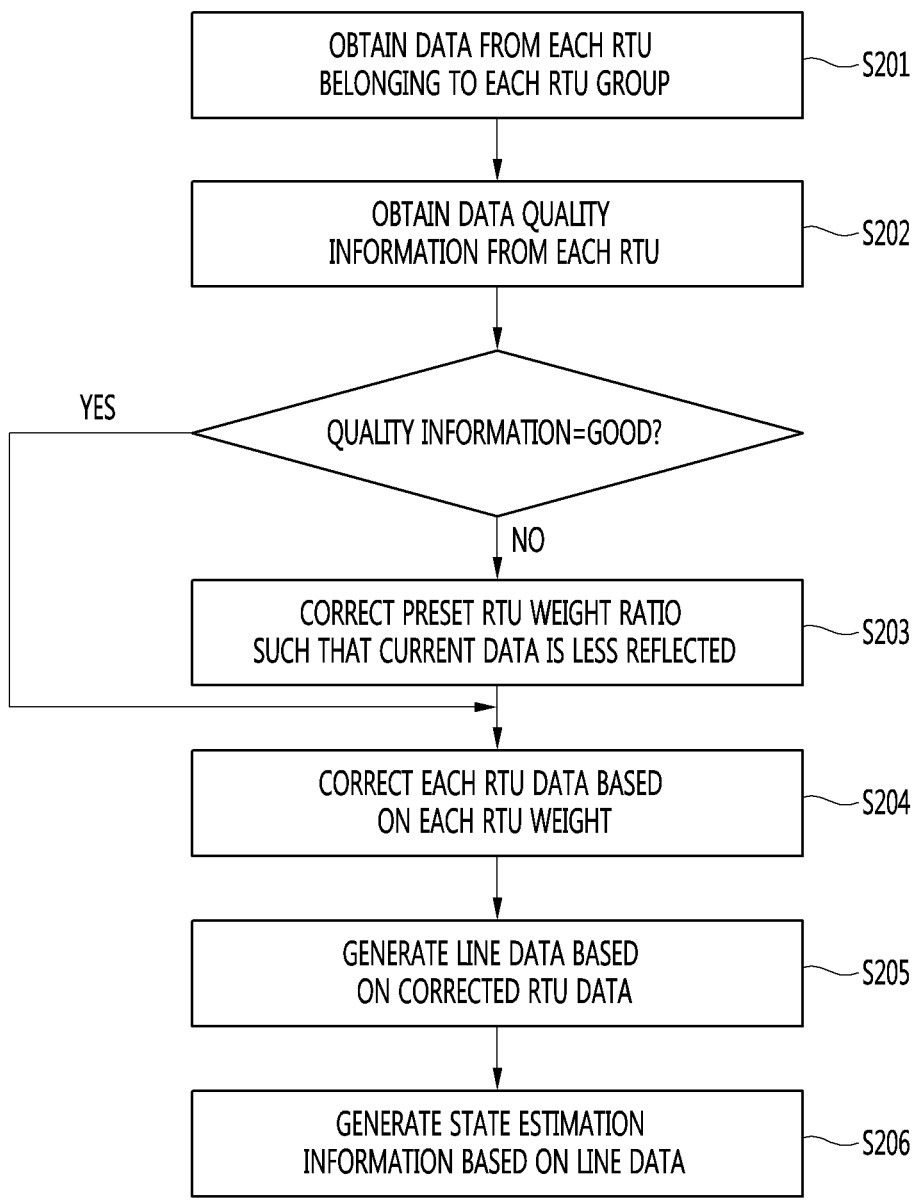
FIG. 7 is a flowchart illustrating an RTU weight applying method according to another embodiment.

FIG. 7 is a flowchart illustrating a RTU weight applying method according to another embodiment.

According to an embodiment, weights respectively applied to facilities may be varied according to the data quality information. In detail, by using an exponential smoothing method, the system analysis matching may be enhanced by obtaining a state estimation value in a manner that a weight is lowered for an obtained value of a facility, from which not good data is frequently obtained, and a weight is increased for an obtained value of a facility, from which good data is obtained at all times.

Referring to FIG. 7, the RCC 100 (of FIG. 6) obtains data from each RTU belonging to each RTU group (operation S201), and obtains data quality information, which includes quality information for each RTU data, from each RTU (operation S202).

When the obtained data quality information is not determined to be "GOOD", the RCC 100 (of FIG. 2) corrects (or changes) a preset RTU weight such that a currently obtained data is less reflected than an previously obtained data (operation S203), and corrects each RTU data on the basis of the each corrected (or changed) RTU weight (operation S204).

When the obtained data quality information is determined to be "GOOD", the RCC 100 (FIG. 2) corrects each RTU data on the basis of each preset RTU weight (operation S204).

When each RTU data is corrected, the controller 110 of the RCC 100 generates line data on the basis of the each corrected RTU data (operation S205), and generates the state estimation information on the basis of the generated line data (operation S206).

FIG. 8 is a block configuration diagram illustrating a RTU weight applying method according to another embodiment.

Referring to FIG. 8, the RCC 100 may consecutively obtain previous and current first generator data of 80 V and 100 V, and data quality information of "BAD" from the first generator 211 (FIG. 3).

When the previous and current first generator data and data quality information are obtained, the RCC 100 may change a preset first generator weight ratio (for the previous data:current data) from, for example, 0.5:0.5, to, for example, 0.6:0.4 such that the currently obtained data is less reflected than the previously obtained data in response to the obtained data quality information of "BAD".

When the preset first generator weight ratio is changed, the RCC 100 may generate a corrected first generator data of 88 V to which the changed first generator weight ratio of 0.6:0.4 is applied to the previous and current first generator data of 80 V and 100 V (i.e. 80 V*0.6+0.4*100 V=88 V).

Identically, the RCC 100 may obtain previous and current second generator data of 100 V and 200 V, and data quality information of "GOOD" from the second generator 212 (FIG. 3).

When the previous and current second generator data and data quality information are obtained, the RCC 100 may maintain a preset second generator weight ratio (e.g. ratio for previous data:current data=0.5:0.5) as 0.5:0.5 in response to the obtained data quality information of "GOOD".

When the preset second generator weight ratio is maintained, the RCC 100 may generate a corrected second generator data of 150 V to which the second generator weight ratio of 0.5:0.5, which is identically maintained as before, is applied to the previous and current second generator data of 100 V and 200 V (i.e. 100 V*0.5+0.5*200 V=150 V).

When the corrected first and second generator data of 88 V and 150 V are generated, the RCC 100 may generate line data of 238 V into which the corrected first and second generator data of 88 V and 150 V are integrated (i.e. 88 V+150 V=238 V), and may generate the state estimation information on a line on the basis of the generated line data of 238 V.

According to an embodiment, the above-described method may be implemented as a processor-readable code on a medium with a program recorded thereon. Examples of the computer readable recording medium include a read-only memory (ROM), random-access memory (RAM), CD-ROMs, magnetic tapes, floppy disks, and optical data storage devices, and also include carrier waves (such as data transmission through the Internet).

According to the operating method of the communication system according to an embodiment, the state estimation matching may be more improved by performing state estimation on each line by applying a weight to each RTU.

As can be seen from the foregoing, the above-described embodiments is not limited to the configurations and methods of the embodiments described above, but the entirety of or a part of the embodiments may be configured to be selectively combined such that various modifications of the embodiments can be implemented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A supervisory control and data acquisition (SCADA) system comprising:
   a plurality of remote terminal units (RTUs) outputting a plurality of pieces of RTU data with a data quality information on each of the plurality of pieces of RTU data, wherein the RTUs are selected from the group consisting of a transformer, a generator, and a load device; and
   a remote control center (RCC) generating a state estimation information on lines respectively connected to the plurality of RTUs,
   wherein the RCC is configured to
   apply a weight for each of the plurality of RTUs to each of the plurality of pieces of RTU data,
   change the weights on a basis of the data quality information,
   generate the state estimation information on lines respectively connected to the plurality of RTUs on a basis of the plurality of pieces of RTU data to which the weights are respectively applied, and
   control the plurality of RTUs on a basis of the state estimation information.

2. The SCADA system according to claim 1, wherein the RCC performs a calculation for multiplying the weight for each of the plurality of RTUs by the plurality of pieces of RTU data.

3. The SCADA system according to claim 1, wherein the RCC lowers the weights applied to corresponding RTUs, when erroneous signals are output in excess of a preset ratio as a result of determination based on the data quality information on at least one or more of the RTUs among the plurality of RTUs.

4. The SCADA system according to claim 1, wherein the RCC lowers the weights applied to a corresponding period where erroneous signals occur, when the erroneous signals are output in excess of a preset ratio as a result of a determination based on the data quality information on at least one or more of the RTUs among the plurality of RTUs.

5. The SCADA system according to claim 1, wherein the RCC changes the weight for each of the plurality of RTUs such that RTU data, which is most recently output, is least reflected based on the data quality information.

6. An operating method of a supervisory control and data acquisition system, the operating method comprising:
   outputting a plurality of pieces of remote terminal unit (RTU) data with a data quality information on each of the plurality of pieces of RTU data;
   applying a weight for each of a plurality of RTUs to each of the plurality of pieces of RTU data, wherein the RTUs are selected from the group consisting of a transformer, a generator, and a load device;
   changing the weights on a basis of the data quality information;
   generating a state estimation information on lines respectively connected to the plurality of RTUs on a basis of the plurality of pieces of RTU data to which the weights are respectively applied, and
   controlling the plurality of RTUs on a basis of the state estimation information.

7. The operating method according to claim 6, wherein a calculation is performed by respectively multiplying the weights for the plurality of RTUs by the plurality of pieces of RTU data.

8. The operating method according to claim 6, wherein the weights applied to corresponding RTUs are lowered, when erroneous signals are output in excess of a preset ratio as a result of a determination based on the data quality information on at least one or more of the RTUs among the plurality of RTUs.

9. The operating method according to claim 6, wherein the weights, which are applied to a corresponding period where erroneous signals occur, are lowered, when the erroneous signals are output in excess of a preset ratio as a result of a determination based on the data quality information on at least one or more of the RTUs among the plurality of RTUs.

10. The operating method according to claim 6, wherein a weight for each of the plurality of RTUs is lowered such that RTU data, which is most recently output, is least reflected based on the data quality information.

\* \* \* \* \*